United States Patent Office 3,291,688
Patented Dec. 13, 1966

3,291,688
ANTHELMINTIC TETRAHYDROPYRIMIDINES
Lloyd H. Conover, Quaker Hill, Conn., assignor to Chas. Pfizer & Co., Inc., New York, N.Y., a corporation of Delaware
No Drawing. Filed Sept. 22, 1964, Ser. No. 398,427
12 Claims. (Cl. 167—53)

This invention relates to the use of novel water-insoluble, non-toxic acid addition salts of certain cyclic amidines which are especially effective as anthelmintic agents. More particularly, it relates to the use of certain water-insoluble, non-toxic acid addition salts of 2-(2-thenylmercapto)-$\Delta^2$-tetrahydropyrimidine and the N-methyl derivative thereof as agents for the veterinary control of helminthiasis in domestic animals.

Helminthiasis, the infestation of the animal body by various species of parasitic worms, is perhaps the most common, most serious and most widespread disease in the world today. Although the economic significance of this disease has led to extensive research for new and more effective anthelmintics, most of the countermeasures developed to date have not been entirely satisfactory for one or more reasons; e.g. poor therapeutic index, specificity of action, high cost, low activity, limited anthelmintic spectrum.

The usual method, indeed, the almost universal method for the treatment of helminthic infections, is the oral administration of the drug of choice. The treatment of helminthiasis by the parenteral (e.g., subcutaneous, intramuscular, intracutaneous, intraperitoneal) administration of suitable drugs has not been practical in view of the nature and location of the parasites involved and the poor activity of available drugs by the parenteral route.

Anthelmintic agents now in commercial use are specific in their action both with respect to the helminth and to the host. The indiscriminate application of the term "anthelmintic" to drugs which have a toxic action upon parasitic worms belonging to more than one animal phylum erroneously conveys the impression that the organism being acted upon belongs to a biological classification comparable to that which encompasses bacteria or fungi since these organisms are subject to attack by antibacterial and antifungal agents. However, this is not the case. Roundworms and flatworms belong to different animal phyla and there is no reason to believe that an anthelmintic effective against *Ascaris lumbricoides* (phylum, nematodes) will have an effect on *Hymenolepsis nana* or *Taenia saginata* (phylum, platyhelminths). Indeed, activity against one phylum cannot be extrapolated to another phylum.

The screening procedures employed in the evaluation of potential anthelmintic agents involve in vitro tests with worms of different types with respect to a stimulating, paralyzing or killing effect. The agents selected in this manner are then, if their solubility, toxicity and stability in the animal body warrants, investigated further in worm-infected animals.

The shortcomings of the in vitro tests become obvious when one considers the following points: the drug may be absorbed or chemically altered before it reaches the helminth; the helminth may be coated with mucous or other substance which serves as a barrier to drug penetration; the physical location of the helminth may be such that the drug does not reach it. The location of the helminth in the host, in fact, constitutes an important reason for the specificity of anthelmintic agents. Moreover, the effectiveness of anthelmintic agents against the same or closely related worm species varies greatly from host to host.

In vivo studies on animal parasites as a means of determining anthelmintic activity against definite species of human parasites are subject to many of the same objections as in vitro studies. Different species or varieties of parasites, great differences in the anatomy and physiology of the intestinal tracts of the hosts, varying food habits and different intestinal contents serve to complicate the experiments. The drug must be tested against the particular helminth in the particular host in order to obtain definitive results.

There is at present no broadly effective anthelmintic drug commercially available. While more than one roundworm may be susceptible to a given drug, no drug is recommended for therapy against both tapeworms and roundworms.

According to the present invention it has now been unexpectedly found that certain non-toxic, water-insoluble salts of 2-(2-thenylmercapto) - $\Delta^2$ - tetrahydropyrimidine and the N-methyl derivative thereof are surprisingly effective agents in the control of helminthiasis in domestic animals by the oral and parenteral routes of administration. They are active against both the nature and immature forms of helminths of the families Ancyclostomidae, Strongylidae and Trichostrongylidae. They are especially effective against the gastrointestinal parasites of ruminants (e.g. sheep, cattle, goats) and of non-ruminants such as dogs, cats, horses.

The water-insoluble, non-toxic acid addition salts, that is, those salts which are non-toxic at the dosages used, of the above mentioned bases which may be employed are the pamoates (1,1'-methylenebis-2-hydroxy-3-naphthoates), amsonates (4,4'-diaminostilbene-2,2'-disulfonates), 2-hydroxy-3-naphthoates, and resin adsorbates derived from porous polymeric, sulfonic acid cation exchange resins. The latter are used only for oral administration.

These compounds are also somewhat less toxic by the parenteral route of administration than by the oral route. These novel water-insoluble salts are of distinct advantage over the analogous water-soluble salts in that they serve as a repository source of the anthelmintic agent when administered parenterally, including by implantation, to the actual or potential host animal. This feature, with its attendant sustained action, is realized to the fullest upon parenteral, and especially upon intramuscular, administration.

Administration by implantation produces an effect similar to that realized by intramuscular injection. In this method the anthelmintic agent is administered by means of an implant given beneath the skin of the host or potential host animal. The implantation is desirably performed on the animal at the weaning stage of development.

Subcutaneous and intramuscular injections, including implantation, are the preferred methods of parenteral injection for several reasons; simplicity, convenience and decreased toxicity. According to this aspect of the present invention, the water-insoluble salts of the anthelmintic agents described herein are administered parenterally, e.g., by subcutaneous or intramuscular injection, to animals suffering from helminthiasis of various types in a dosage of from about 10 mg./kg. to about 150 mg./kg. of body weight. A single injection is generally sufficient but, in the event multiple doses are employed, the injection is repeated at a suitable interval, e.g., monthly. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with the theraputic efficiency of the preparation and are non-toxic in the volume or proportion used (glycerol, propylene glycol, sorbitol). Additionally, compositions suitable for extemporaneous preparation of suspensions or non-aqueous solutions prior to administration may advantageously be made. Such compositions may include liquid diluents, for example, propylene glycol, diethyl carbonate, glycerol, sorbitol, etc.; buffering agents, as well as hyaluronidase (spreading factor), local anesthetics and inorganic salts to afford desirable pharmacological properties.

Parenteral administration of these anthelmintic agents in combination with hyaluronidase avoids local irritation. An increase in the rate of absorption of the drug is observed and the pain due to swelling and distention is greatly reduced if not completely eliminated. Hyaluronidase levels of at least about 150 (U.S.P.) units are very effective in this respect. Higher or lower levels can, of course, be used but 150 units per dose appears to give consistently good results as evidenced by the absence of edema and the general behavior of the animal following injection of the drug preparation.

When administered by the oral route the novel products of this invention are given in dosages, calculated as free base, of from about 5 mg./kg. to about 150 mg./kg. of body weight. This can be achieved by a number of methods, including mixing with the feed, dosage unit formulations such as capsules, tablets, liquid mixtures and drenches, or they can be administered in admixture with minerals such as sodium chloride which are frequently fed to animals as a supplement. The dosage specified is based on active ingredient, namely the base form of the cyclic amidine.

For therapeutic use, a dosage, calculated as free base, of 25 to 100 mg./kg. of body weight is recommended. Ordinarily a single dose is sufficient, but in the event multiple doses are employed, this dose is repeated on 2 or 3 consecutive days. Since the present method is effective against not only the mature worms but also against the larval stages, it is not necessary to repeat the dosage after a period of 2 to 3 weeks as is commonly done with prior anthelmintic agents. For administration to sheep, goats, cattle, horses and swine on a therapeutic basis, a drench solution or suspension which is squirted down the animal's throat by a means of a drenching syringe is convenient. Drenches having concentration ranging from about 3% up to 50% of the athelmintic agent are satisfactory.

For prophylactic use, 5 to 60 mg., calculated as free base, is administered per kg. of body weight daily. The above methods of administration are suitable although administration in the animal's food or mineral mixture is more convenient.

Boluses and capsules are also used for the therapeutic treatment of animals. For animals weighing from 30 to 1000 pounds the usual dose ranges from ½ to 45 grams. Boluses of suitable sizes containing these materials can be prepared by conventional methods.

Dry mineral mixtures containing the products of this invention are prepared containing from 0.10 to about 10% of the active ingredient mixed with salt (sodium chloride) and other minerals with which it is desired to treat the anmal. This can then be fed on an ad libitum basis by adjusting the proportion of active ingredient in the mixture to the average daily consumption per animal so as to provide the proper daily dose as specified above. If prepared feed supplements are employed, the material can be administered in admixture with the feed. Again, a concentration range of about 0.10 to 1% of the drug in the feed is employed. However, higher proportions can be satisfactorily employed depending upon the palatability of the product to the animal. This can be readily determined by simple experimentation. It is generally advisable to mix the daily dose with only a portion of the animal's average daily allotment to insure complete consumption of the dose. The balance of his daily feed supplement can then be fed after consumption of the medicated portion in the usual fashion. These methods are particularly useful for prophylactic treatment, but similar compositions can be employed for therapeutic use. Concentrations of drug in the feed or mineral mixture up to from 2 to 5%, depending again upon the palatability of the material, are sometimes useful. Additionally, these compounds can be used in micronized form especially when used in emulsions or suspensions by either the oral or parenteral route of administration.

The water-insoluble acid addition salts of 2-(2-thenylmercapto)-$\Delta^2$-tetrahydropyrimidine, and its N-methyl derivative, 1-methyl-2-(2-thenylmercapto)-$\Delta^2$-tetrahydropyrimidine, are soluble in organic solvents such as dimethyl sulfoxide and propylene glycol. For the purpose of this invention solutions having concentrations ranging from about 10% up to the limt of solubility of the salt are useful. Solutios having at least about 20% concentration are generally favored since such solutions minimize the volume of solution which must be administered.

In view of the slight tendency of aqueous suspensions of these material to hydrolyze upon prolonged storage, it is preferred to make up the suspension just prior to administration. These agents, it should be noted, can be used either in the form of solutions or suspensions, aqueous or non-aqueous. Dry mixtures containing the active ingredients together with salt (sodium chloride) and/or buffering agents or local anesthetics are prepared for extemporaneous use. A concentration of active ingredient in such mixtures of at least about 50% is useful. It should be noted these agents can be used alone or in combination with each other or other drugs.

In addition to their outstanding efficacy as anthelmintic agents via parenteral and oral administration, the water-insoluble acid addition salt of 2-(2-thenylmercapto)-$\Delta^2$-tetrahydropyrimidine and its N-methyl derivative are also larvacidal against Strongyloides, Trichostrongylus, Nematodirus and Haemonchus. They are, therefore, valuable for preventing infection and re-infection by spraying the areas, e.g., pastures, pens, used by animals. By spraying areas used or to be used by animals prophylaxis is realized and, by administering these valuable agents to the animals before placing them in such areas, the development of clinical disease is prevented.

The 2-(2 - thenylmercapto)-$\Delta^2$-tetrahydropyrimidines and their water-insoluble, acid addition salts are prepared by known methods. The most convenient route comprises reaction of 2-thenyl chloride with the desired alkylene thiourea. The 2-thenyl chloride is prepared from thiophene by chloromethylation according to Blicke et al. (J. Am. Chem. Soc. 64, 477, 1942) as illustrated in U.S. 2,956,923. Alternatively, it is obtained by reacting thiophene with dimethyl formamide as described by Campaigne and Archer, J. Am. Chem. Soc., 75, 989–91 (1953). The 2-aldehyde thus produced is reduced to the alcohol and then chlorinated by known methods to give the corresponding 2-thenyl chloride.

The alkylene thioureas are obtained by reaction of the corresponding alkylenediamine with carbon disulfide according to known procedures.

The procedure for making 2-(2-thenylmercapto)-$\Delta^2$-tetrahydropyrimidine given in Australian Patent 235,865 is illustrated below.

When prepared as described above the valuable anthelmintic agents are obtained as their hydrochloride salts. Since the free bases are insoluble in water they are readily obtained from the hydrochloride salts by careful neutralization, preferably in the cold, of an aqueous solution of said salts and immediate extraction into a suitable water immiscible organic solvent. The free base is then converted to other salts as described herein.

The preparation of water-insoluble, acid addition salts of this invention is achieved by simply dissolving the free base in a suitable solvent, e.g., lower alcohols containing the desired acids. The salts are recovered by precipitation with a non-solvent, by evaporation, or by lyophilization. The 2-hydroxy-3-naphthoic acid forms 1:1 salts with the herein described cyclic amidines. Pamoic and amsonic acids form salts in which the ratio of cyclic amidine to acid is 1:1 or 2:1 depending upon the molar ratio of reactants. Since the anthelmintic agent is generally prepared as its hydrochloride salt, an alternative and preferred method comprises the reaction of the hydrochloride salt in aqueous solution with an alkali metal salt of the desired acid. In the case of a monoprotic acid, e.g., 2-hydroxy-3-naphthoic acid, the hydrochloride salt of the anthelmintic agent and the sodium or potassium salt of the acid are reacted in equimolar proportions. In the case of a diprotic acid, e.g., pamoic or amsonic acids, the disodium or dipotassium salt of the acid, or a mixed sodium-potassium salt, is used in the proper molar-ratio to produce the desired salt. In place of the alkali metal salts of the acids other metal salts such as alkaline earth salts, e.g., calcium, barium magnesium, or salts of other metals which form water soluble chlorides, e.g., zinc, cadmium, copper, tin, can be used. The insoluble acid salt of the anthelmintic agent which precipitates is separated, washed free of chloride and dried.

For the preparation of resin adsorbates wherein the 2-(2-thenylmercapto)-$\Delta^2$-tetrahydropyrimidine or its N-methyl derivative is adsorbed on a strong cation exchange resin, a variety of resins are available. These cation-exchange resins include such materials as the Dowex-50 resins (available from the Dow Chemical Company) which are sulfonated polystyrene compounds cross-linked with a divinyl aromatic compound such as divinylbenzene and described in U.S. Patents 2,191,853; 2,366,007; 2,518,420; and in BIOS 621, No. 22 (1446); the Amberlites such as Amberlite IR–120, and Amberlite XE–176 (available from the Rohm & Haas Company) which are sulfonated polystyrene compounds cross-linked with 8% and 1% divinylbenzene, respectively. In general, resins possessing a high degree of porosity are favored. Such resins (i.e., Dowex 50–X1, Dowex 50–X2) contain a low degree of cross-linkage (1% and 2%, respectively) with a copolymerizing agent such as divinylbenzene and are characterized by a relatively rapid rate of adsorption and/or elution. Moreover, since the mesh size of the resin particles affects the rate of adsorption and elution, the resin should preferably be from about 50 to 400 mesh U.S. sieve series if rapid release is desired. Resins in this mesh range combine suitable features of adsorption in the batch and column processes and elution in the gastrointestinal tract.

Moreover, the resin adsorbates retain their high stability even when incorporated into animal feeds and are, therefore, particularly valuable for oral administration.

The resin adsorbates of the present invention have certain advantages when administered to animals in that the cyclic amidine adsorbed on the resin is appreciably protected from the acid gastric juices and passes practically unchanged through the gastric system into the intestinal tract which, having a higher pH, is effective in removing the compound from the resin, facilitating adsorption into the system.

Preparation of the resin adsorbates comprises, in general, contacting an aqueous solution of a water-soluble salt of the desired cyclic amidine, e.g., the hydrochloride, sulfate, citrate, acetate, nitrate, with the chosen resin at about 20° C., that is, from about 10° C. to 60° C. utilizing sufficient resin to adsorb a major part of the cyclic amidine. Under optimum conditions an adsorbate containing as high as 0.50 gram of cyclic amidine per gram of resin adsorbate can be prepared. However, this depends upon the concentration of the solution, temperature, pH, the nature of the resin and other factors.

The adsorbates may be prepared by either a batch or column process. In the former, an aqueous solution of a water-soluble salt of the chosen cyclic amidine is slurried with the chosen resin and the whole stirred for a suitable period of time depending upon the characteristics of the resin employed. In the column process, an aqueous solution of a water-soluble salt of the desired cyclic amidine is percolated through a column of the resin, generally until the concentration of the eluate corresponds to that of the solution being treated. Although this procedure generally produces a higher potency product the batch process is preferred from a practical standpoint.

The following examples are provided to illustrate the manner of practicing the present invention in greater detail. They are, however, not to be construed as limitations of this invention, many variations of which are possible without departing from the scope and spirit thereof.

EXAMPLE I

2-(2-thenylmercapto)-$\Delta^2$-tetrahydropyrimidine hydrochloride

Twenty-seven grams of thenylchloride(2-chloromethylthiophene) is added over a ten-minute period to a stirred, refluxing solution of 25 g. of trimethylene thiourea in 100 ml. of methanol. The mixture is refluxed for an additional half-hour, then cooled to 0° C. and slowly poured into 250 ml. of diethylether with stirring. After 15 minutes the product is collected by filtration, washed with diethyl ether and air dried. The product is a white crystalline solid, readily soluble in water, which melts at 152° C.

In like manner but substituting N-methyltrimethylene thiourea for trimethylene thiourea the N-methyl derivative is prepared as its hydrochloride salt.

They are converted to the free bases by neutralization of aqueous solutions of the hydrochloride salts. The water insoluble bases precipitate, are collected, washed free of inorganic salts and dried. Alternatively, the free bases are extracted immediately into a water immiscible solvent (ether, n-butanol) and recovered by removal of the solvent.

EXAMPLE II

Preparation of insoluble salts

*Method A.*—The appropriate free base is added with stirring to a warm alcohol solution containing a stoichiometric proportion of the desired acid and the mixture stirred until a clear solution results. The solution is then concentrated and ether added until precipitation is complete. The salt is collected and dried.

In the case of the 2-hydroxy-3-naphthoic acid a 1:1 molar ratio of base to acid is used. With pamoic and amsonic acids 1:1 and 2:1 molar ratios are used to produce the corresponding salts.

*Method B.*—A solution of 0.2 mole of monopotassium pamoate (85.3 g.) and 0.2 mole of sodium hydroxide (8.0 g.) in 800 ml. of water is added slowly with stirring to a solution of 0.4 mole (100.0 g.) of 2-(2-thenylmercapto)-$\Delta^2$-tetrahydropyrimidine hydrochloride in 500 ml. of water at room temperature. The gummy precipitate is separated from the water by decantation of the water, then taken up in a hot solution of acetonitrile (800 ml.)-water (90 ml.). The crystals which separate upon cooling are removed by filtration, washed with water and dried. Yield of crude material is 148.0 g. It is purified by recrystallization from acetonitrile (600 ml.)-water (75 ml.); M.P. 107.2–108.0° C.

EXAMPLE III

*Preparation of resin adsorbates, batch process*

The cyclic amidines, in the form of their hydrochloride salts, are dissolved in water and the solution added to a well stirred suspension of the sodium form of Amberlite IR–176 (sulfonated polystyrene cross-linked with 1% divinylbenzene), 200–400 mesh. The suspension is stirred for about 3 hours, filtered, washed with water and dried in vacuo.

EXAMPLE IV

*Preparation of resin adsorbate, column process*

The cyclic amidines in the form of an aqueous solution of their hydrochlorides, acetates, citrates or other water soluble salt, are percolated through a column of 200–400 mesh Dowex 50–X2 (sulfonated polystyrene cross-linked with 2% divinylbenzene) until the concentration of the eluate corresponds to that of the solution being treated. The resin is then washed with water, removed from the column and dried.

EXAMPLE V

*Tablets and boluses*

Tablets are prepared by thoroughly blending a quantity of the desired cyclic amidine salt equivalent to 250 g. to 500 g. of free base, and 50 g. of starch in a twin shell blender. The blended powders are then mixed with sufficient ethanol to make an easily manipulated paste which is extruded through a 10-mesh screen to provide granules which are dried in vacuo until all the solvent is removed. The granules are coated with magnesium stearate by briefly blending with 2% the total weight of granules of that substance. This mixture is then fed to a tableting press to produce tablets containing the equivalent of 250 mg. of the desired agent in addition to proportionate quantities of the carriers and excipients listed above. For animals, the daily dose varies from ½ to 45 g. per day depending again upon the body weight of the animal. Boluses of various sizes can be prepared in the same fashion by simply selecting a die of appropriate size. A dose of 15 g. can be incorporated into a single bolus.

EXAMPLE VI

*Capsules*

The insoluble cyclic amidine salts are conveniently encapsulated in hard gelatin capsules. For therapeutic and prophylactic purposes, from about 250 mg. to 1 gram of these agents can be contained in a single capsule. It is convenient to mix the active ingredient with a solid diluent, for instance, calcium phosphate. From about 15 to 50% the weight of drug of tricalcium phosphate is employed. Thus, a hard gelatin capsule is prepared by thoroughly blending two parts by weight of mono-[2-(2-thenylmercapto)-$\Delta^2$-tetrahydropyrimidine]pamoate with one part by weight of calcium phosphate in a twin shell blender. The powder is then subdivided, and loaded into hard gelatin capsules in such a fashion that each capsule contains the equivalent of 250 mg. free base.

EXAMPLE VII

*Mineral mixture*

One part by weight of 2-(2-thenylmercapto)-$\Delta^2$-tetrahydropyrimidine 2-hydroxy-3-naphthoate is mixed with nineteen parts by weight of the usual granular stock of salt (sodium chloride). The mixture is thoroughly blended and fed to the animals in such quantities as to provide the recommended daily dose. Such salt mixtures can also be incorporated into block form, but this is not preferred due to lack of control of the dosage size received by the animal.

EXAMPLE VIII

*Feed mixture*

For prophylactic use a feed mixture containing the anthelmintic agents is convenient. The usual prophylactic dose is from 2.5 to 5 g. daily for 1000 pound cattle. Assuming such animal consumes 10 lbs. of feed supplement per day, one pound per ton of cyclic amidine salts of this invention would, depending upon the salt, be incorporated. Depending upon the feed consumption of the animal and the dosage employed, the proportion of cyclic amidine calculated as free base in the feed varies from .05% up to about 1% on a weight basis.

EXAMPLE IX

Eight lambs, each weighing about 100 pounds, naturally infected with gastrointestinal nematodes (Haemonchus, Strongyloides, Nematodirus) are selected at random and divided into 4 pairs. The first pair, I–A and B, serve as controls and receive no drug. The second (II–A and B), third (III–A and B) and fourth (IV–A and B) pairs received 20, 40 and 80 mg./kg. of body weight of mono-[2-(2-thenylmercapto)-$\Delta^2$-tetrahydropyrimidine]pamoate, respectively, per os.

Egg counts are made on the three days preceding the treatment and on the third, sixth and tenth days following treatment. Results are tabulated below in Tables I and II, respectively.

TABLE I.—EGGS PER GRAM OF FECES BEFORE MEDICATION

| Animal No. | Day −3 | | | | Day −2 | | | | Day −1 | | | |
|---|---|---|---|---|---|---|---|---|---|---|---|---|
| | N | S | H | Total | N | S | H | Total | N | S | H | Total |
| I–A | 0 | 1,000 | 4,880 | 5,880 | 0 | 1,200 | 3,400 | 4,600 | 0 | 880 | 3,280 | 4,160 |
| I–B | 0 | 0 | 4,200 | 4,200 | 0 | 0 | 4,800 | 4,800 | 0 | 0 | 4,840 | 4,840 |
| II–A | 0 | 200 | 640 | 840 | 0 | 480 | 2,040 | 2,520 | 0 | 520 | 2,080 | 2,600 |
| II–B | 120 | 200 | 560 | 880 | 80 | 200 | 880 | 1,160 | 0 | 440 | 4,120 | 4,560 |
| III–A | 0 | 1,120 | 1,120 | 2,240 | 0 | 1,360 | 1,440 | 2,800 | 0 | 840 | 1,120 | 1,960 |
| III–B | 0 | 200 | 760 | 960 | 0 | 360 | 1,160 | 1,520 | 0 | 440 | 1,400 | 1,840 |
| IV–A | 0 | 0 | 280 | 280 | 40 | 0 | 480 | 520 | 80 | 0 | 880 | 960 |
| IV–B | 0 | 0 | 360 | 360 | 0 | 0 | 680 | 680 | 0 | 0 | 1,040 | 1,040 |

N=Nematodirus; S=Strongyloides; H=Haemonchus.

TABLE II.—EGGS PER GRAM OF FECES AFTER MEDICATION

| Animal No. | Drug, mg./kg. | Day +3 | | | | Day +6 | | | | Day +10 | | | |
|---|---|---|---|---|---|---|---|---|---|---|---|---|---|
| | | N | S | H | Total | N | S | H | Total | N | S | H | Total |
| I-A | None | 0 | 0 | 3,320 | 3,320 | 0 | 0 | 4,720 | 4,720 | 0 | 0 | 2,360 | 2,360 |
| I-B | None | 0 | 0 | 4,480 | 4,480 | 0 | 0 | 4,280 | 4,280 | 0 | 0 | 3,600 | 3,600 |
| II-A | 20 | 0 | 40 | 1,120 | 1,160 | 0 | 520 | 480 | 1,000 | 0 | 560 | 400 | 960 |
| II-B | 20 | 0 | 320 | 200 | 520 | 60 | 0 | 400 | 500 | 40 | 0 | 40 | 80 |
| III-A | 40 | 0 | 480 | 120 | 600 | 0 | 240 | 80 | 320 | 0 | 480 | 0 | 480 |
| III-B | 40 | 0 | 200 | 40 | 240 | 0 | 0 | 0 | 0 | 0 | 0 | 0 | 0 |
| IV-A | 80 | 0 | 0 | 0 | 0 | 0 | 0 | 0 | 0 | 0 | 0 | 80 | 80 |
| IV-B | 80 | 0 | 0 | 80 | 80 | 0 | 0 | 0 | 0 | 0 | 0 | 0 | 0 |

The percent reduction in total eggs and in eggs of Haemonchus, based on the data in Table II, is provided in Tables III and IV.

TABLE III.—TOTAL EGGS PER GRAM REDUCTION

| Sheep No. | Avg. E.P.G. Before Medication | Avg. E.P.G. After Medication | Percent Reduction |
|---|---|---|---|
| I-A | 4,880 | 3,467 | 28.95 |
| I-B | 4,613 | 4,120 | 10.68 |
| II-A | 1,987 | 1,040 | 47.66 |
| II-B | 2,200 | 367 | 83.32 |
| III-A | 2,333 | 467 | 79.98 |
| III-B | 1,440 | 80 | 94.44 |
| IV-A | 587 | 27 | 95.40 |
| IV-B | 693 | 27 | 96.10 |

TABLE IV.—EGGS PER GRAM REDUCTION OF HAEMONCHUS

| Sheep No. | Avg. E.P.G. Before Medication | Avg. E.P.G. After Medication | Percent Reduction |
|---|---|---|---|
| I-A | 3,853 | 3,467 | 10.09 |
| I-B | 4,613 | 4,120 | 10.69 |
| II-A | 1,587 | 667 | 57.97 |
| II-B | 1,853 | 227 | 87.75 |
| III-A | 1,227 | 67 | 94.54 |
| III-B | 1,107 | 13 | 98.83 |
| IV-A | 547 | 27 | 95.06 |
| IV-B | 693 | 27 | 96.10 |

EXAMPLE X

Repetition of the preceding experiment with six randomly selected, naturally infected lambs, produces the following results. The drug, when administered subcutaneously in a single dose as a 20% emulsion (20 grams of drug, 50 ml. distilled water, 45 ml. mineral oil and .5 ml. Arlacel A, a fatty acid partial ester of sorbitol anhydride available from Atlas Powder Co., blended in a Waring Blendor until the mixture passes freely through a 16-gauge needle) at levels of 30 and 60 mg./kg. of body weight produces significant reduction in the nematode fauna of the gastrointestinal tract of the treated sheep.

EXAMPLE XI

Oral administration of mono-[2-(2-thenylmercapto)-$\Delta^2$-tetrahydropyrimidine]pamoate as a single dose drench (5% suspension in 9.5% corn starch aqueous solution) to sheep (naturally infected with gastrointestinal nematodes) at levels of 50, 100 and 200 mg./kg. of body weight gives the following results. Two sheep are used at each dosage level and two sheep serve as control group.

TABLE V.—EGGS PER GRAM OF FECES BEFORE MEDICATION

| Animal No. | Day −3 | | | | Day −2 | | | | Day −1 | | | |
|---|---|---|---|---|---|---|---|---|---|---|---|---|
| | N | S | O | Total | N | S | O | Total | N | S | O | Total |
| I-A | 0 | 8,360 | 440 | 8,800 | 0 | 10,800 | 0 | 10,800 | 0 | 9,280 | 0 | 9,280 |
| I-B | 0 | 0 | 1,920 | 1,920 | 0 | 0 | 2,020 | 2,020 | 0 | 0 | 2,440 | 2,440 |
| II-A | 80 | 0 | 760 | 840 | 80 | 0 | 1,800 | 1,880 | 120 | 0 | 1,640 | 1,760 |
| II-B | 120 | 40 | 320 | 480 | 80 | 40 | 340 | 460 | 40 | 80 | 280 | 400 |
| III-A | 120 | 0 | 340 | 460 | 80 | 0 | 880 | 960 | 80 | 0 | 1,000 | 1,080 |
| III-B | 160 | 0 | 1,720 | 1,880 | 360 | 0 | 2,480 | 2,840 | 80 | 0 | 1,620 | 1,700 |

TABLE VI.—EGGS PER GRAM OF FECES AFTER MEDICATION

| Animal No. | Drug, mg./kg. | Day +3 | | | | Day +6 | | | | Day +10 | | | |
|---|---|---|---|---|---|---|---|---|---|---|---|---|---|
| | | N | S | O | Total | N | S | O | Total | N | S | O | Total |
| I-A | 0 | 0 | 8,440 | 0 | 8,440 | 0 | 9,880 | 0 | 9,880 | 0 | 8,440 | 0 | 8,440 |
| I-B | 0 | 0 | 0 | 2,120 | 2,120 | 0 | 0 | 2,180 | 2,180 | 0 | 0 | 1,560 | 1,560 |
| II-A | 50 | 0 | 0 | 80 | 80 | 0 | 0 | 160 | 160 | 0 | 0 | 0 | 0 |
| II-B | 50 | 0 | 0 | 0 | 0 | 20 | 0 | 0 | 20 | 40 | 120 | 0 | 160 |
| III-A | 100 | 0 | 0 | 0 | 0 | 0 | 340 | 660 | 1,000 | 40 | 0 | 80 | 80 |
| III-B | 100 | 0 | 0 | 280 | 280 | 0 | 0 | 0 | 0 | 0 | 160 | 0 | 280 |

EXAMPLE XII

Repetition of the preceding experiment but using the drug suspended in 1% bentonite in 10% concentration at a level of 100 mg./kg. of body weight gives the following significant results. In some instances the drug is effective 100% based on egg-count reduction.

TABLE VII.—EGGS PER GRAM OF FECES BEFORE MEDICATION

| Animal No. | Day −3 | | | | Day −2 | | | | Day −1 | | | |
|---|---|---|---|---|---|---|---|---|---|---|---|---|
| | N | S | O | Total | N | S | O | Total | N | S | O | Total |
| I-A | 0 | 13,000 | 200 | 13,200 | 0 | 17,640 | 40 | 17,680 | 0 | 10,640 | 240 | 10,880 |
| I-B | 20 | 3,020 | 3,600 | 6,640 | 0 | 6,580 | 6,500 | 13,080 | 0 | 2,640 | 5,120 | 6,760 |
| II-A* | 0 | 120 | 100 | 220 | 20 | 820 | 700 | 1,540 | 0 | 380 | 180 | 560 |
| II-B* | 0 | 720 | 20 | 740 | 0 | 2,460 | 60 | 2,520 | 0 | 1,600 | 140 | 1,740 |

O=Other Strongyles and Trichostrongyles.
*Pregnant ewes.

TABLE VIII.—EGGS PER GRAM OF FECES AFTER MEDICATION

| Animal No. | Drug, mg./kg. | Day +3 | | | | Day +6 | | | | Day +10 | | | | Day +17 | | | |
|---|---|---|---|---|---|---|---|---|---|---|---|---|---|---|---|---|---|
| | | N | S | O | Total | N | S | O | Total | N | S | O | Total | N | S | O | Total |
| I-A | | 0 | 13,780 | 180 | 13,960 | 0 | 16,220 | 300 | 16,520 | 0 | 12,680 | 280 | 12,960 | 0 | 4,520 | 260 | 4,780 |
| I-B | | 20 | 5,680 | 7,500 | 13,200 | 20 | 2,240 | 3,960 | 6,240 | 20 | 2,700 | 3,700 | 6,400 | 0 | 2,000 | 3,740 | 5,940 |
| II-A* | 100 | 0 | 1,660 | 0 | 1,660 | 0 | 1,860 | 0 | 1,860 | 0 | 700 | 0 | 700 | 0 | 1,600 | 0 | 1,600 |
| II-B* | 100 | 0 | 1,360 | 0 | 1,360 | 0 | 1,400 | 0 | 1,400 | 0 | 1,600 | 0 | 1,600 | 0 | 700 | 0 | 700 |

*Pregnant ewes.

EXAMPLE XIII

Following the procedures of the preceding Examples IX–XII, the 2-hydroxy-3-naphthoate and the di-pamoate salts of 2-(2-thenylmercapto) - $\Delta^2$ - tetrahydropyrimidine and its N-methyl derivative are found to produce substantially the same results.

The resin adsorbates of the cyclic amidines when administered in feed mixtures are effective therapeutically and prophylactically.

What is claimed is:

1. A method for the veterinary control of helminthiasis which comprises the administration to an animal of an effective dose of a water-insoluble salt of a compound selected from the group consisting of 2-(2-thenylmercapto)-$\Delta^2$-tetrahydropyrimidine and 1-methyl - 2 - (2-thenylmercapto)-$\Delta^2$-tetrahydropyrimidine; said water-insoluble salt being selected from the group consisting of the pamoates, amsonate, 2-hydroxy-3-naphthoate, and resin adsorbate of a porous sulfonic acid cation exchange resin.

2. The method of claim 1 wherein the compound is administered in dosage unit form.

3. The method of claim 1 wherein the compound is 1-methyl-2-(2-thenylmercapto) - $\Delta^2$ - tetrahydropyrimidine amsonate.

4. The method of claim 1 wherein the compound is 2 - (2-thenylmercapto)-$\Delta^2$-tetrahydropyrimidine resin adsorbate wherein the 2-(2-thenylmercapto)-$\Delta^2$-tetrahydropyrimidine is present as an adsorbate on a porous sulfonic acid cation exchange resin of low toxicity.

5. The method of claim 1 wherein the compound is mono-[2 - (2-thenylmercapto) - $\Delta^2$ - tetrahydropyrimidine]pamoate.

6. The method of claim 1 wherein the compound is di-[2-(2-thenylmercapto) - $\Delta^2$ - tetrahydropyrimidine]pamoate.

7. A method for the veterinary control of helminthiasis which comprises the subcutaneous administration to an animal of from about 10 mg. to about 150 mg., calculated as free base, per kg. of body weight of a water-insoluble salt of a compound selected from the group consisting of 2-(2-thenylmercapto) - $\Delta^2$ - tetrahydropyrimidine and 1-methyl-2-(2-thenylmercapto) - $\Delta^2$ - tetrahydropyrimidine; said water-insoluble salt being selected from the group consisting of the pamoates, amsonate, and 2-hydroxy-3-naphthoate.

8. The method of claim 7 wherein the compound is administered intramuscularly.

9. A method for the veterinary treatment of helminthiasis which comprises the parenteral administration to an animal suffering therefrom of from about 25 mg. to about 100 mg., calculated as free base, per kg. of body weight of a water-insoluble salt of a compound selected from the group consisting of 2-(2-thenylmercapto)-$\Delta^2$-tetrahydropyrimidine and 1-methyl-2-(2-thenylmercapto)-$\Delta^2$-tetrahydropyrimidine; said water-insoluble salt being selected from the group consisting of the pamoates, amsonate, and 2-hydroxy-3-naphthoate.

10. The method of claim 9 wherein the compound is administered intramuscularly.

11. A method for the veterinary prevention of helminthiasis which comprises daily administration to an animal of from about 5 mg. to about 60 mg., calculated as free base, per kg. of body weight of a water-insoluble salt of a compound selected from the group consisting of 2-(2-thenylmercapto)-$\Delta^2$-tetrahydropyrimidine and 1-methyl-2-(2-thenylmercapto) - $\Delta^2$ - tetrahydropyrimidine; said water-insoluble salt being selected from the group consisting of the pamoates, amsonate, and 2-hydroxy-3-naphthoate.

12. A method of combatting helminths which comprises applying to the larva of said helminths and their habitat an effective amount of a water-insoluble salt of a compound selected from the group consisting of 2-(2-thenylmercapto)-$\Delta^2$-tetrahydropyrimidine and 1-methyl-2-(2-thenylmercapto) - $\Delta^2$ - tetrahydropyrimidine; said water-insoluble salt being selected from the group consisting of the pamoates, amsonate, and 2-hydroxy-3-naphthoate.

References Cited by the Examiner

UNITED STATES PATENTS 2,956,923   10/1960   Kent.

FOREIGN PATENTS 889,002   2/1962   Great Britain.

JULIAN S. LEVITT, *Primary Examiner.*

R. BARRESE, *Assistant Examiner.*